(12) United States Patent  (10) Patent No.: US 8,350,805 B2
Miyazaki et al.  (45) Date of Patent: Jan. 8, 2013

(54) ENTERTAINMENT SYSTEM AND PROCESSING APPARATUS

(75) Inventors: Yoshio Miyazaki, Tokyo (JP); Koji Hamada, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 391 days.

(21) Appl. No.: 11/914,325

(22) PCT Filed: Feb. 23, 2007

(86) PCT No.: PCT/JP2007/000122
§ 371 (c)(1),
(2), (4) Date: Feb. 13, 2009

(87) PCT Pub. No.: WO2007/116578
PCT Pub. Date: Oct. 18, 2007

(65) Prior Publication Data
US 2009/0174657 A1 Jul. 9, 2009

(30) Foreign Application Priority Data
Apr. 11, 2006 (JP) ................................ 2006-109211

(51) Int. Cl.
*G09G 5/00* (2006.01)
(52) U.S. Cl. .......................................... 345/156; 463/39
(58) Field of Classification Search .......... 345/156–178; 463/36–39
See application file for complete search history.

(56) References Cited

U.S. PATENT DOCUMENTS
7,331,856 B1 * 2/2008 Nakamura et al. ................. 463/7
2003/0128187 A1 * 7/2003 Strubbe ......................... 345/157

FOREIGN PATENT DOCUMENTS
| EP | 0 813 072 | 12/1997 |
| EP | 1 033 882 | 9/2000 |
| JP | 10-249064 | 9/1998 |
| JP | 10-249064 A | 9/1998 |
| JP | 2000-29619 | 1/2000 |
| JP | 2000-29621 | 1/2000 |
| JP | 2000-29621 A | 1/2000 |
| JP | 2000-82108 | 3/2000 |

(Continued)

OTHER PUBLICATIONS

Supplementary European Search Report dated Oct. 16, 2009, from the corresponding European Application.

International Preliminary Report on Patentability, and English translation thereof, dated Nov. 17, 2008 from the corresponding PCT/JP2007/000122.

(Continued)

*Primary Examiner* — Stephen Sherman
(74) *Attorney, Agent, or Firm* — Katten Muchin Rosenman LLP

(57) ABSTRACT

In a game system 1 of the present invention, an image capturing device 2 captures a controller 20. The controller 20 includes a plurality of LEDs which express controller numbers assigned to the controller 20 in a game application to be executed, and periodically repeats the turning on and off of an LED in a flashing pattern defined in accordance with the controller number assigned. A cycle of the flashing is set so that the flashing appears to be continuous to a user, on the other hand, so that a continuous turning-off state and a continuous turning-on state are captured alternately in succession by the image capturing device 2. The game device 10 determines if the controller 20 is located in the image capturing space of the mage capturing device 2 based on the captured images which are captured continuously at a predetermined capturing speed by the image capturing device 2.

11 Claims, 8 Drawing Sheets

FOREIGN PATENT DOCUMENTS

| | | |
|---|---|---|
| JP | 2000-172431 | 6/2000 |
| JP | 2000-259340 | 9/2000 |
| JP | 2001-321564 | 11/2001 |
| JP | 2002-202843 | 7/2002 |
| JP | 2002-202843 A | 7/2002 |
| JP | 2003-236245 | 8/2003 |
| JP | 2003-254716 | 9/2003 |

OTHER PUBLICATIONS

Translation of the International Search Report dated Apr. 17, 2007, from the corresponding International Application.

Notification of Reason(s) for Refusal dated Apr. 28, 2009, from the corresponding Japanese Application.

* cited by examiner

| CONTROLLER NUMBER | PWM CONTROLLER | FLASHING PATTERN |
|---|---|---|
| 1 | FIRST PWM CONTROLLER | FLASHING PATTERN 1 |
| 2 | SECOND PWM CONTROLLER | FLASHING PATTERN 2 |
| 3 | THIRD PWM CONTROLLER | FLASHING PATTERN 3 |
| 4 | FOURTH PWM CONTROLLER | FLASHING PATTERN 4 |

FIG.10
| FLASHING PATTERN | CONTINUOUS TURNING-ON PERIOD | CONTINUOUS TURNING-OFF PERIOD |
|---|---|---|
| FLASHING PATTERN 1 | $3/20$ SECONDS (=9 FRAMES) | $7/20$ SECONDS (=21 FRAMES) |
| FLASHING PATTERN 2 | $5/20$ SECONDS (=15 FRAMES) | $5/20$ SECONDS (=15 FRAMES) |
| FLASHING PATTERN 3 | $7/20$ SECONDS (=21 FRAMES) | $3/20$ SECONDS (=9 FRAMES) |
| FLASHING PATTERN 4 | $9/20$ SECONDS (=27 FRAMES) | $1/20$ SECONDS (=3 FRAMES) |
FIG.11A
FIG.11B
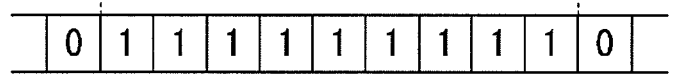
FIG.11C
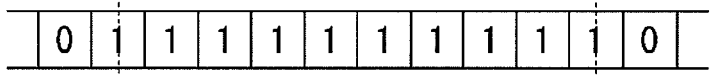
FIG.11D
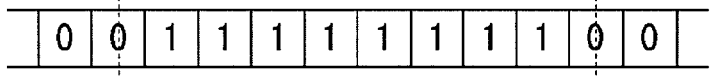
FIG.11E
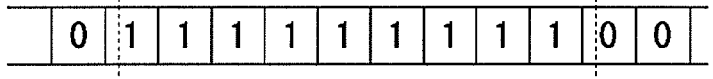
FIG.11F
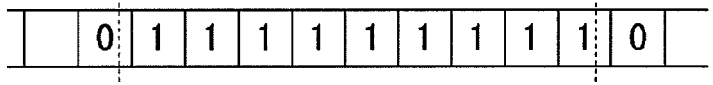

ENTERTAINMENT SYSTEM AND PROCESSING APPARATUS

TECHNICAL FIELD

The present invention relates to a technique for recognizing an object located in the real space.

BACKGROUND ART

In recent years, a technique has been presented in which a two-dimensional code is taken by a camera, code data is recognized and a predetermined process associated with the code data is executed. Various types of two-dimensional codes are in practical use at present, since a two-dimensional code can include more coded information, in comparison with a one-dimensional bar code. Under these circumstances, a technique relating to image recognition of a two-dimensional code has been conventionally presented (for example, see Patent Document 1).

In order to acquire a three-dimensional position or the like of an object located in the real space, a technique has been presented in which a three-dimensional position or a three-dimensional posture is recognized by flashing each of a plurality of LEDs equipped on the object in a uniquely determined flashing pattern, respectively, and using images captured by a two-dimensional image sensor (for example, see Patent Document 2). In Patent Document 2, an LED serving as a marker has the identification information which can be uniquely identified for each LED.

Patent Document 1: Japanese Patent Laid-Open No. 2000-82108;
Patent Document 2: Japanese Patent Laid-Open No. 2003-254716.

DISCLOSURE OF THE INVENTION

With the recent development of technologies, hardware specifications of game systems have dramatically improved. This has led to diversification of game applications. In recent years, a game system has been realized in which when a user moves his/her body in front of a camera connected to a game device, the game device optically recognizes the user's movement and uses it as an input for a game. Under such game environments, the inventors have considered that a new game system could be realized by effectively utilizing a camera connected to a game device. In addition, if objects in the real space are captured by a camera and the information obtained by processing the captured images with respect to the objects could be displayed on image display devices, it is considered that applications effective for not only game systems but also entertainment systems in other environments such as education fields or business fields, can be created.

Therefore, a general purpose of the present invention is to provide an entertainment system in which a camera is effectively utilized.

MEANS FOR SOLVING THE PROBLEMS

To solve the aforementioned problems, an entertainment system of an embodiment of the present invention includes: an input device through which a user performs an input operation; a processing device which processes an application based on the input entered into the input device and generates an image signal showing a result of the processing of the application; an image capturing device which captures a space; and an image display device which outputs the image signal generated in the processing device. In an entertainment system of the embodiment, the input device has a plurality of input units through which a user performs an input operation to make an application proceed, and a plurality of light emitting elements for expressing a number assigned to the input device in an application to be executed, and the device periodically repeats the turning on and off of the light emitting element in a flashing pattern determined in accordance with the number assigned. The processing device determines if the input device is located in the image capturing space of the image capturing device, based on the captured images which have been continuously captured at a predetermined capturing speed by the image capturing device.

Another embodiment of the present invention provides a processing device including: an application processing unit which processes an application based on an input entered into an input device; an acquisition unit which acquires the data of a frame image in which a space, in which a light emitting element of the input device is located, is captured, the light emitting element periodically flashing in accordance with a number assigned to the input device in the application; and a determination unit which determines if the input device is located in the frame image based on the continuous frame image data.

Note that any combination of the aforementioned components or any manifestation of the present invention realized by modifications of a method, device, system, storing media, computer program, and so forth, is effective as an embodiment of the present invention.

BRIEF DESCRIPTION OF THE DRAWINGS

FIG. 10 is a diagram which shows a continuous turning-on period and a continuous turning-off period in each flashing pattern; and FIG. 11 is an illustrative diagram to explain a turning-on LED image which is captured in continuous frame images by the LED image extracting unit.

REFERENCE NUMERALS

Figure 1:
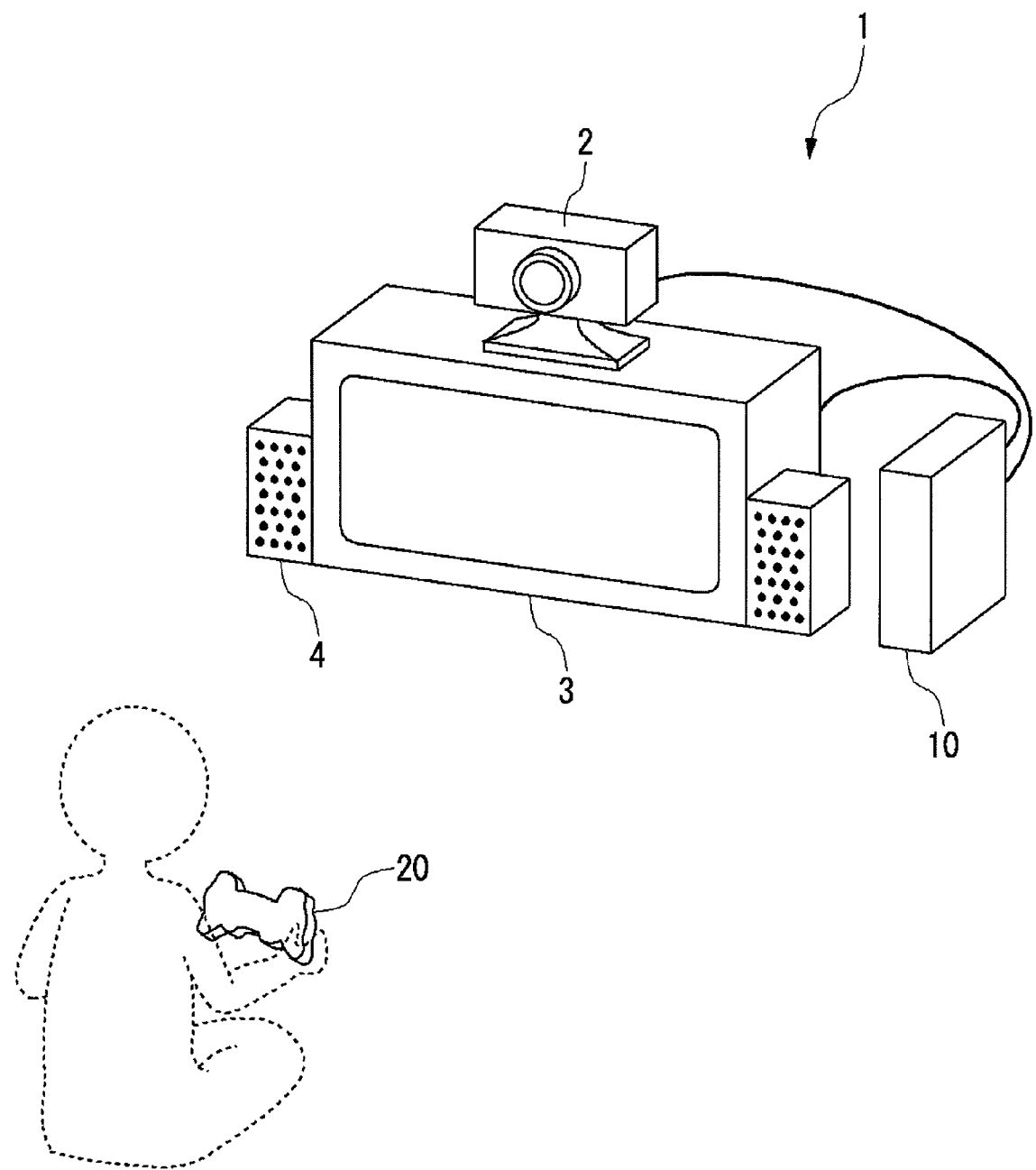
FIG. 1 is a diagram which shows an environment in which a game system according to an embodiment of the present invention is used.

1 game system
2 image capturing device
3 image display device
4 sound output device
10 game device
20 controller
40 LED 50 main controller
52 input receiving unit
54 PWM controller
56 driving unit
58 wireless communication module
60 processing unit
100 input unit
102 image processing unit
104 position estimation unit
108 wireless communication module
110 application processing unit
112 output unit
130 frame image acquisition unit
132 binary image generator
134 determination unit
136 LED image extracting unit

BEST MODE FOR CARRYING OUT THE INVENTION

FIG. 1 shows an environment in which a game system according to an embodiment of the present invention is used. The game system 1 includes an image capturing device 2, an image display device 3, a sound output device 4, a game device 10, and a controller 20. The image capturing device 2, the image display device 3, the sound output device 4, and the controller 20 are connected to the game device 10.

The controller 20 is an input device for a user to perform an input operation. The game device 10 is a processing device which processes a game application based on an input entered into the controller 20 and generates an image signal showing a result of the processing of the game application. Note that the technique described in the present embodiment can be realized in an entertainment system which is provided with a processing unit which executes other types of applications, without being limited to a game application. Representing such entertainment systems, the game system 1 which executes a game application will be described below.

The image capturing device 2 is a video camera structured by CCD image sensors or CMOS image sensors etc., and the device 2 captures images of the real space at a predetermined capturing speed to generate time continuous frame images. For example, an image capturing speed of the image capturing device 2 may be 60 sheets per second. The image capturing device 2 is connected to the game device 10 via a USB (Universal Serial Bus) or another interface. An RGB color filer is equipped in front of the photo receiving surface of the image capturing device 2, thereby the device 2 generates frame image data in which each RGB pixel value is expressed in 256 gradations.

The image display device 3 is a display which outputs an image signal, and receives an image signal which has been generated in the game device 10 to display a game screen. The sound output device 4 is a speaker which outputs a sound, and receives a sound signal generated in the game device 10 to output a game sound. The image display device 3 and the sound output device 4 compose an output device in the game system 1.

The game device 10 and the image display device 3 may be connected with each other via either a wire connection or a wireless connection. Alternatively, the game device 10 and the image display device 3 may be connected via an AV cable. Still alternatively, a home network structured by a network (LAN) cable or a wireless LAN or the like, may be structured between the game device 10 and the image display device 3.

The controller 20 serves to transmit an input entered by a user to the game device 10. In the present embodiment, the controller 20 is structured as a wireless controller capable of communicating with the game device 10 via a wireless connection. The controller 20 and the game device 10 may establish a wireless connection using the Bluetooth® protocol. The game device 10 can be connected to a plurality of controllers 20 via wireless connections, that is, in the game system 1, the game device 10 can be connected to N pieces of the controllers 20. The game device 10 serves as a parent device or a master, and the controller 20 as a child device or a slave. Alternatively, the controller 20 may be a wired controller connected to the game device 10 via a cable, without being limited to a wireless controller.

The controller 20 is driven by a battery, and is provided with a plurality of buttons and keys for performing an input operation to develop a game. When a user operates buttons or keys on the controller 20, an input entered into the controller is transmitted to the game device 10 via a wireless connection. The game device 10, upon receiving the input entered with respect to a game application from the controller 20, controls the development of a game in accordance with the input entered to generate a game image signal and a game sound signal. The generated game image signal and the game sound signal are output from the image display device 3 and the sound output device 4, respectively. In addition, the game device 10 also serves to transmit a vibration control signal which makes the controller 20 vibrate in accordance with the development of a game, to the controller 20. The controller 20 having an oscillator vibrates the oscillator upon receiving the vibration control signal.

In the game system 1 of the present embodiment, the controller 20 is provided with a plurality of light emitting elements. Each of the plurality of light emitting elements is an LED of the same color, and serves as an indicator expressing a controller number assigned in a game application. A controller number in the game application is required to be notified to a user by any suitable means, since the user utilizes the number, for example, when selecting a game character at the beginning of the game. Therefore, a controller number is made to be confirmed by user's eye in a manner that among a plurality of LEDs, for example, when a first LED turns on, the controller number is one, and when a second LED on, the number is two. Alternatively, a controller number may be expressed by a combination of two or more LEDs. Still alternatively, a plurality of LEDs may be composed of LEDs with different colors, and in such a case, a controller number may be confirmed by a user by the difference among the emission colors.

If the controller 20 is a wired controller, a user generally can confirm a controller number by the port to which a cable connector extending from the controller 20 is connected. However, a user cannot confirm a controller number immediately when a multi-port device having a plurality of ports is used with the device connected to the game device 10. Therefore, even if a controller is structured as a wired controller, a plurality of LEDs are preferably employed to inform a user of a controller number.

In the game system 1 of the present invention, an LED of the controller 20 periodically repeats the turning on and off according to a flashing pattern defined in accordance with a controller number. In the flashing pattern, a continuous turning-on period of an LED is set to a period equal to or longer than a period during which two frame images are continuously captured by the image capturing device 2. Similarly, a continuous turning-off period is set to a period equal to or longer than a period during which two frame images are continuously captured by the image capturing device 2.

A repeating cycle and a continuous turning-on period of an LED, while a battery power consumption in an LED can be reduced by repeating the turning on and off of an LED, is set so that the turning off of an LED can not be confirmed by a user's naked eye. Therefore, an LED in a flashing state appears to be in a turning-on state to a user's naked eye. Due to this, an LED can be made to serve as an indicator expressing a controller number to a user, as well as to the game device 10, as described in details later. Briefly speaking, the game device 10, when the image capturing device 2 captures an LED, can acquire a plurality of frame images in which a turning-on LED is captured, and a plurality of frame images in which a turning-off LED is captured, therefore, by comparing those images with a flashing pattern of an LED, a controller number of a controller 20 holding the LED can be identified. A flashing pattern of an LED may be the one in which a duty ratio in a predetermined cycle is defined.

The image capturing device 2 captures an LED of a controller 20 and generates a frame image thereof to provide to the game device 10. The game device 10, upon acquiring the frame image, may acquire an estimated position of the controller 20 in the frame image based on a position of the LED image in the frame image, and reflect the acquired position information on the processing of a game application. That is, the game device 10 of the present embodiment may process a game application using not only an input entered into the controller 20 but also the acquired position information of the controller 20, and have a function to generate an image signal showing a result of the processing of the game application.

Figure 2:
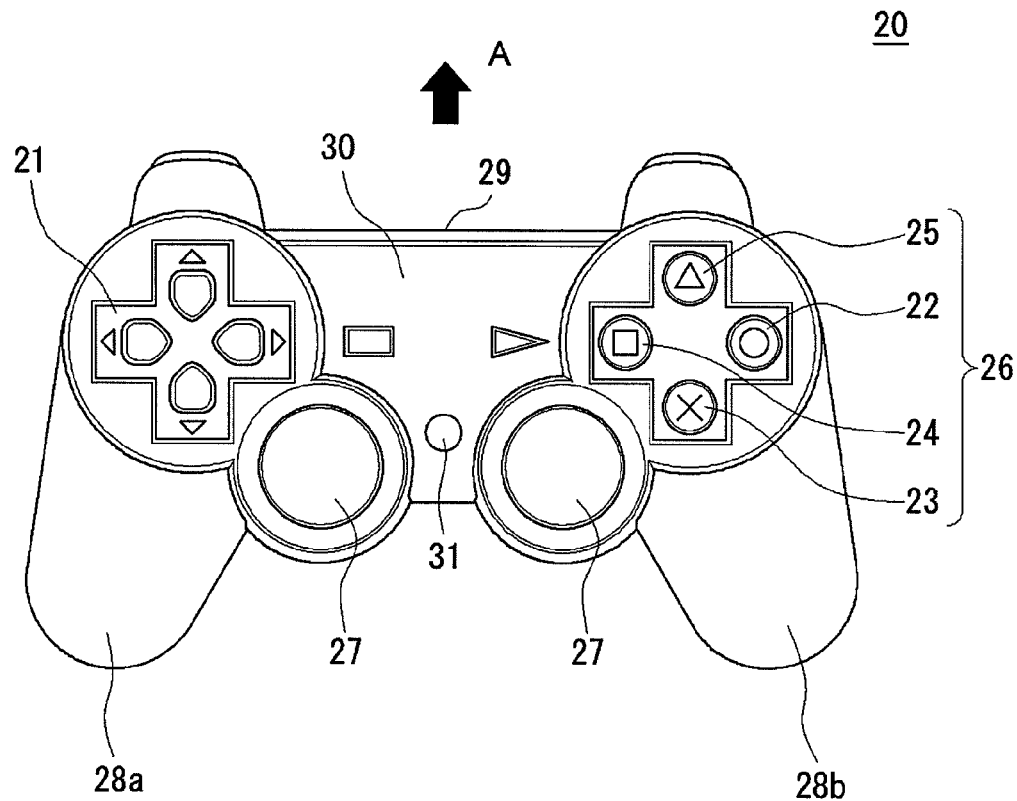
FIG. 2 is a diagram which shows an exterior structure of an controller.

FIG. 2 shows an exterior structure of a controller. The controller 20 is provided with a direction key 21, an analogue stick 27, and four types of operating buttons 26. A direction key 21, an analogue stick 27 and operating buttons 26 are input units provided on the top face 30 of the case. The four types of the buttons 22 to 25 are marked with different figures with different colors to distinguish each of them. That is, the button 22 is marked with a red circle, the button 23 with a blue cross, the button 24 with a purple square, the button 25 with a green triangle. The controller 20 is provided with a plurality of LEDs on the back face 29 of the case.

A user holds the left grip portion 28a of the controller 20 with his/her left hand, the right grip portion 28b with his/her right hand, and operates the controller 20. The direction key 21, the analogue stick 27, and the operating buttons 26 are provided on the top face 30 of the case so that a user can operate the controller, while holding the left grip portion 28a and the right grip portion 28b.

A button 31 with an LED is also provided on the top face 30 of the case. The button 31 with an LED is, for example, used as a button through which a menu screen is displayed on the image display device 3. In addition, the button 31 also serves to notify a user of the arrival of an e-mail or indicate a battery charge state of the controller 20 by a emission state of an LED. An LED is turned on in a manner that, for example, an LED turns red while charging, turns green when the charge is over, or flashes red when the remaining battery power is little.

The image display device 3 is located in front of the controller 20 designated by the arrow A, because a user plays a game while watching a game screen displayed on the image display device 3. Thus, the back face 29 of the case provided with an LED normally faces the image display device 3. In the present embodiment, since the image capturing device 2 is required to capture an LED while a game application is being executed, the image capturing device is preferably located so that the capturing range thereof faces in the same direction as that of the image display device 3, thereby facing the back face 29 of the case of the controller 20. Because a user generally plays a game in front of the image display device 3 in most cases, the image capturing device 2 is located so that the direction of its optical axis matches the front direction of the image display device 3. Specifically, the image capturing device 2 is preferably located in the neighborhood of the image capturing device 3, so that a region, in which a user can confirm visually the display screen of the image display device 3, is included in the capturing space thereof. Due to this, the image capturing device 2 can capture the user's body and the controller 20.

Figure 3:
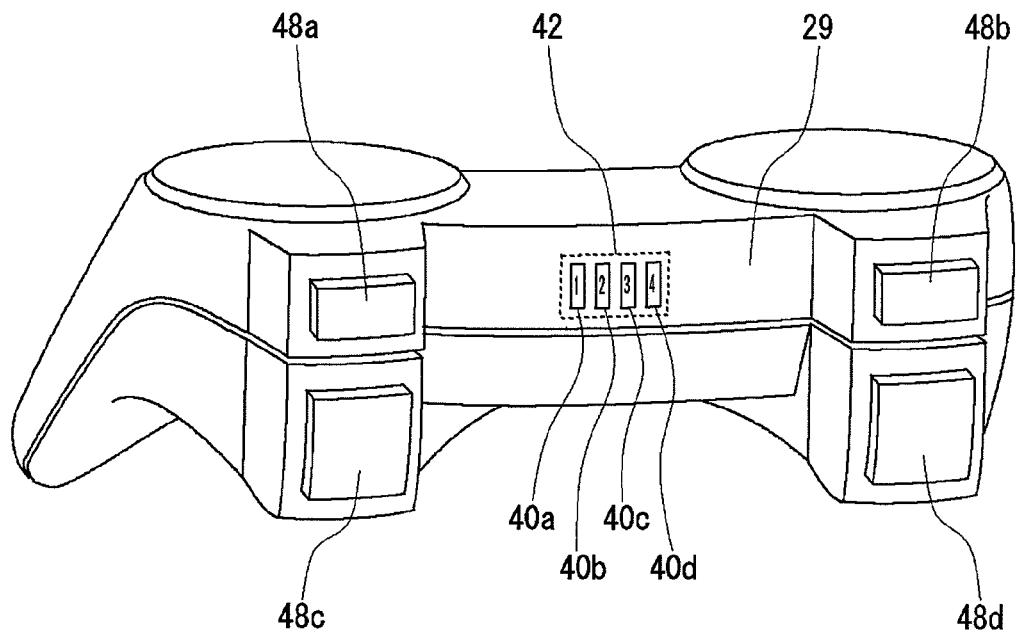
FIG. 3 is a diagram which shows an exterior structure on the back side of an controller.

FIG. 3 shows an exterior structure on the back side of an controller. In FIG. 3, the direction key 21 and the operating buttons 26 or the like on the top face 30 of the case of the controller 20 are not illustrated. The LED providing region 42 is provided on the back face 29 of the case, with a first LED 40a, a second LED 40b, a third LED 40c, and a fourth LED 40d located in the LED providing region 42. Note that the first LED 40a, the second LED 40b, the third LED 40c, and the fourth LED 40d are hereinafter collectively referred to as the "LED 40". The LED providing region 42 is formed in the central region of the back face 29 of the case.

On the back face 29 of the case, the operating buttons 48a, 48b, 48c, and 48d are provided on either side across the LED providing region 42. The operating buttons 48a, 48b, 48c, and 48d are provided at the positions where a user can operate them with the tip of his/her forefinger, while he/she is holding the left grip portion 28a and the right grip portion 28b. By providing the LED providing region 42 in the central region of the back face 29 of the case, the LED 40 is not hidden by a forefinger while operating the operating buttons 48a, 48b, 48c, and 48d.

The first LED 40a, the second LED 40b, the third LED 40c, and the fourth LED 40d may be located, for example, in a row as shown in FIG. 3, or in a predetermined two-dimensional pattern. The LEDs 40 are provided inside the case and a semitransparent plate is provided on the case side. The semitransparent plate is engraved with a number, thereby, allowing a user to know a controller number by watching the number of the LED 40 which turns on.

Figures 4, 5:
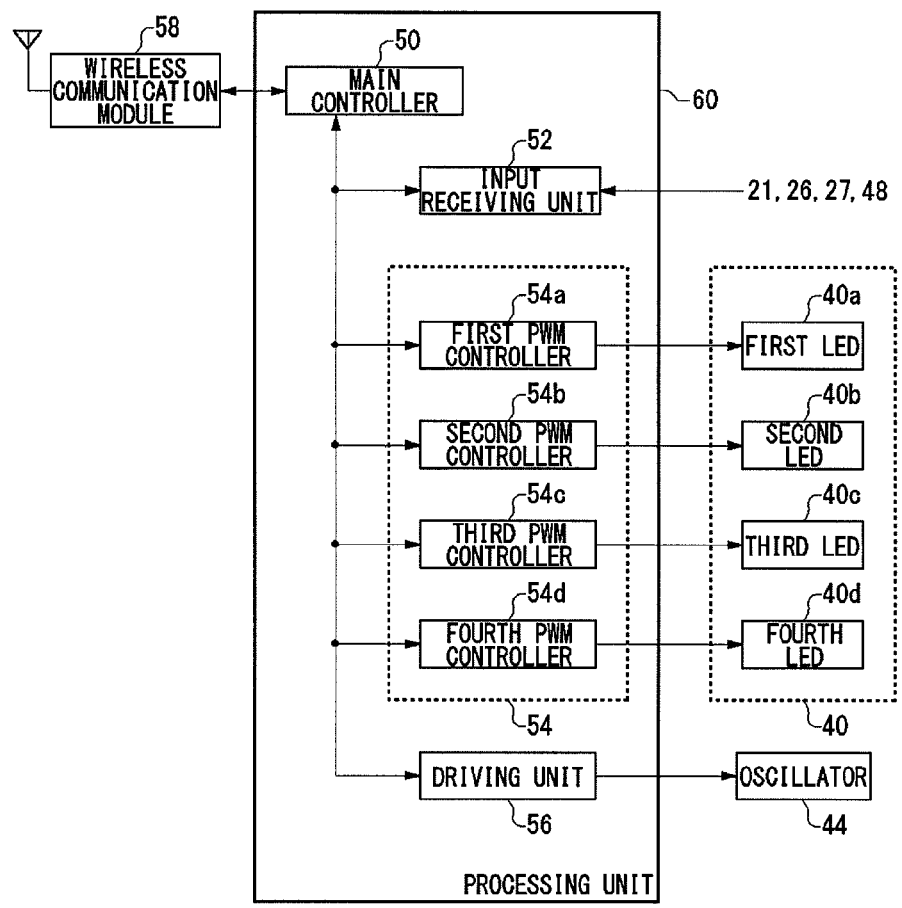
FIG. 4 is a diagram which shows an interior structure of an controller.
FIG. 5 is a diagram which shows an example of a corresponding table held by the main controller.

FIG. 4 shows an interior structure of an controller. The controller 20 includes a wireless communication module 58, a processing unit 60, LED 40, and an oscillator 44. The wireless communication module 58 serves to transmit and receive data between the game device 10 and the wireless communication module. The processing unit 60 executes an expected processing in the controller 20.

The processing unit 60 includes a main controller unit 50, an input receiving unit 52, a PWM controller 54, and a driving unit 56. The main controller 50 transmits and receives the necessary data to and from the wireless communication module 58.

The input receiving unit 52 receives the input information from an input unit such as the direction key 21, the operating buttons 26, the analogue stick 27, or the operating buttons 48, and transmits the data to the main controller unit 50. The main controller unit 50 provides the received input information to the wireless communication module 58, then the wireless communication module 58 transmits the information to the game device 10 at a predetermined timing. In addition, the wireless communication module 58, upon receiving a vibration control signal from the game device 10, provides the signal to the main controller 50. The main controller 50 actuates the driving unit 56 which vibrates the oscillator 44 based on the vibration control signal. The driving unit 56 may be structured as a switch for driving the oscillator 44, or as a PWM controller for varying a duty ratio of the supply voltage.

In the present embodiment, the PWM controller 54 is structured by a first PWM controller 54a, a second PWM controller 54b, a third control unit 54c, and a fourth PWM controller 54d. The first PWM controller 54a, the second PWM controller 54b, the third control unit 54c, and the fourth PWM controller 54d are provided for controlling the turning on of the first LED 40a, the second LED 40b, the third LED 40c, and the fourth LED 40d, respectively. The PWM controller 54 control a voltage applied to the LED 40 by PWM (Pulse Width Modulation). The PWM controller 54 controls a voltage which is applied to the LED 40, so as to periodically repeat the turning on and off of the LED 40 at a cycle in which the image capturing device 2 can capture the turning on and off of the LED 40, while making the LED 40 look turning on continuously to a user's naked eye. The main controller 50 can turn on any one of the LED 40, by driving any one of the first PWM controller 54a to the fourth PWM controller 54d.

In the game system 1 of the present embodiment, a controller 20 of a user who desires to participate in the game system 1, at first establishes a communication with the game device 10. At the time, the identification information of the controller 20, for example, a Bluetooth address, is transferred to the game device 10 and the following communications will be performed based on the Bluetooth address. Alternatively, if the Bluetooth is not used as the communication protocol, a device address such as a MAC address may be used. During establishment of a communication link, the LED 40 may flash at a cycle in which the turning on and off of the LED 40 can be confirmed visually by a user, to notify the user of the communication link being under establishment. After the link is established, the game device 10 assigns a controller number to the controller 20, causing the user to participate in the game application.

The game device 10 transmits the data designating the controller number to the controller 20. The main controller unit 50, based on the information directing the number, controls the turning on and off of only the LED 40 corresponding to the controller number assigned. In the turning on and off control, the LED 40 turns on and off periodically; however, it is preferable that the LED 40 appears to be continuously on to a user's naked eye. Due to this, a user can confirm a controller number assigned to his/her controller 20 with his/her naked eye. Further, a consumption power can be reduced by repeating turning on and off alternately.

The main controller 50 controls the turning on and off of the LED 40 corresponding to the controller number, by the flashing pattern defined in accordance with the controller number assigned. In the game system 1 of the present embodiment, the LED 40 which turns on, and the flashing pattern by which a turning-on period and a turning-off period are determined, are defined uniquely in accordance with the controller number assigned. The main controller 50 holds an PWM controller 54 which drives an LED 40 that turns on and off in accordance with the controller number, and a table through which a flashing pattern is identified.

FIG. 5 shows an example of a corresponding table held by the main controller 50. In this table, the PWM controller 54 each of which drives a different LED 40, and flashing patterns are recorded in association with a plurality of controller numbers. Flashing patterns 1 to 4 are configured to have different duty ratios. The main controller 50, upon receiving the information directing the number which directs, for example, the controller number two from the game device 10, the controller drives the second PWM controller 54b in accordance with the flashing pattern 2, with reference to the corresponding table, causing the turning on and off of the second LED 40b to be repeated periodically.

Figure 6:
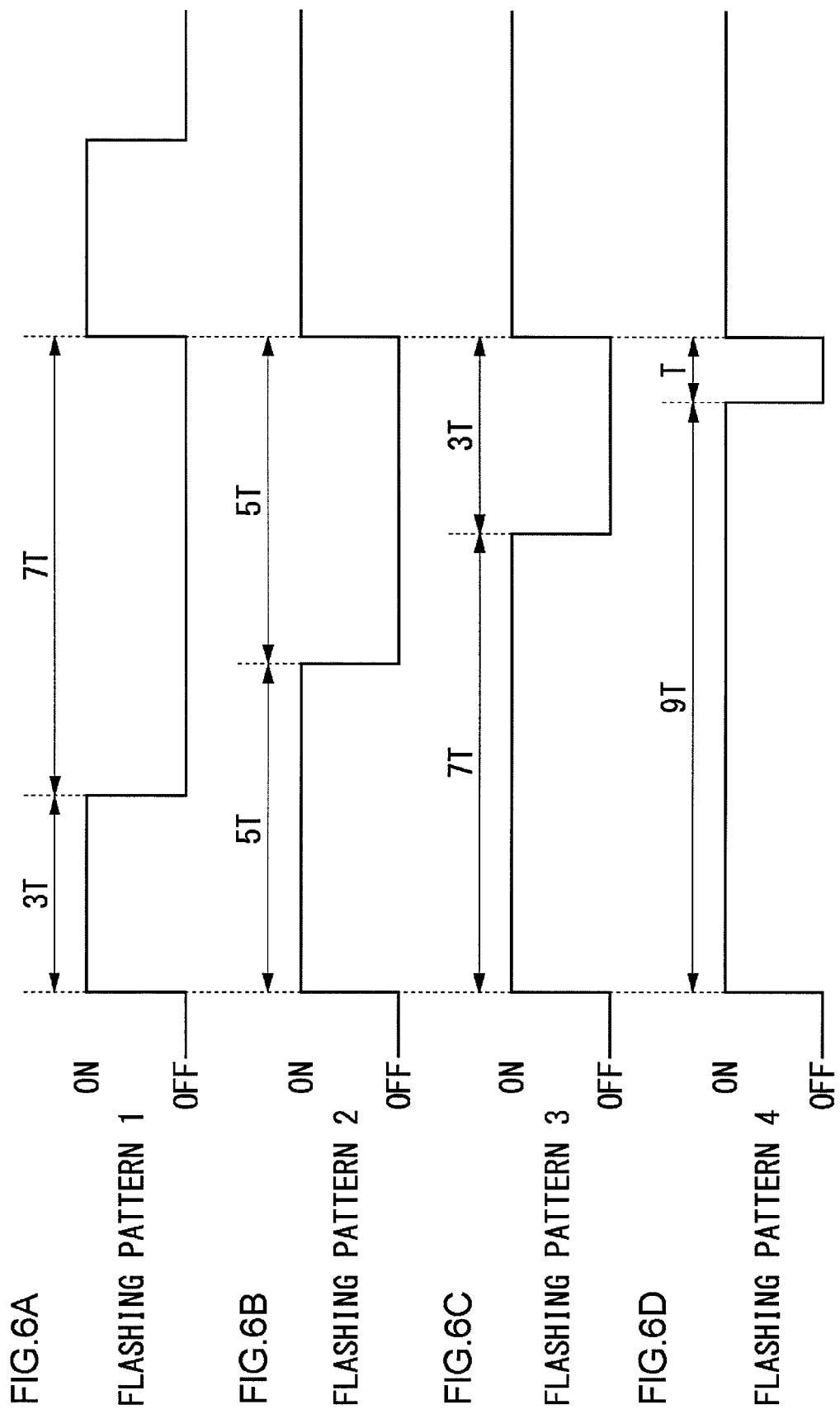
FIG. 6 is a diagram which shows an example of a flashing pattern of a light emitting element.

FIG. 6 shows examples of flashing patterns. FIG. 6 (a) shows the flashing pattern 1, FIG. 6 (b) the flashing pattern 2, FIG. 6 (c) the flashing pattern 3, and FIG. 6 (d) the flashing pattern 4, respectively. In the examples of FIG. 6, all flashing patterns have the same cycle (10 T), and a cycle is formed of a continuous turning-on period and a continuous turning-off period. In a cycle: the flashing pattern 1 is a pattern in which the continuous turning-on period is 3T and the continuous-turning off period is 7T; the flashing pattern 2 is a pattern in which the continuous turning-on period is 5T and the continuous turning-off period is 5T; the flashing pattern 3 is a pattern in which the continuous turning-on period is 7T and the continuous turning-off period is 3T; the flashing pattern 4 is a pattern in which the continuous turning-on period is 9T and the continuous turning-off period is 1T. The cycle (10T) in a flashing pattern is set in accordance with a capturing speed of the capturing image device 2.

If there are a plurality of controllers 20 in the game system 1, the game device 10 assigns controller numbers in ascending order starting from 1, to the controller in the order of the connection being established. By ensuring a controller number and a flashing pattern number to be the same, flashing patterns as a result are assigned in ascending order starting from 1, to the controller 20. As illustrated in the Figure, a duty ratio of a flashing pattern is set so that the smaller a flashing pattern number, the lower a duty-ratio of a flashing pattern, and the larger a flashing pattern number, the higher a duty-ratio of a flashing pattern. Accordingly, a flashing pattern with a lower duty ratio is used on a preferential basis. The lower a duty ratio which defines the turning on and off, the greater the effect of saving power of a battery in a controller 20. As shown in the present embodiment, by preferentially using a flashing pattern with a lower duty ratio, the efficiency of saving power of a battery in the controller 20 can be improved.

A flashing pattern is set on the basis of an image capturing speed of the image capturing device 2. Specifically, a flashing pattern is set so that a continuous turning-on period of the LED 40 is equal to or longer than a period during which two frame images are continuously captured by the image capturing device 2. Further, a continuous turning-off period of the same is equal to or longer than a period during which two frame images are continuously captured by the image capturing device 2. An image capturing speed of the image capturing device 2 of the present embodiment is 60 sheets per second, therefore a continuous turning-on period and a continuous turning-off period are set so as to be equal to or longer than 2/60 seconds (=0.33 seconds), respectively.

For example, in the flashing patterns shown in FIGS. 6(a) to 6(d), the shortest period of the continuous turning-on periods and the continuous turning-off periods is the continuous turning-off period T shown in FIG. 6(d). For this reason, T is set so as to be equal to or longer than a period necessary for two continuous frame images, that is, 2/60 seconds. In addition, if the image capturing speed of the image capturing device 2 is 1/30 seconds (=0.067 seconds), the continuous turning off period in FIG. 6(d) is set to be equal to or longer than 2/30 seconds (=0.067 seconds).

Further, a flashing pattern is preferably set in its cycle such that a user cannot recognize the turning on and off of a light with a user's naked eye. A long cycle of the turning on and off of the LED 40 is sometimes recognized by a user's naked eye as a flash of light. For this reason, a cycle of a flashing pattern is preferably set so as to be short enough to the extent that a flash cannot be confirmed visibly by a user's naked eye, and long enough to the extent that a turning-on state and a turning-off state can be captured distinctly by the image capturing device 2.

In the above embodiments, the game device 10 transmits the information directing the number which directs a controller number, and the controller 20 controls the turning on and off of an LED 40 based on the information directing the number. Besides that, the game device 40 may transmit the control information which designates the turning on and off of an LED 40 corresponding to the controller number, instead of the information directing the number. The control information includes the information in which a driven LED 40 or a driven PWM controller 54 is identified, and a flashing pattern. The main controller 50 may drive and control an expected PWM controller 54 based on the control information. Alternatively, the control information may include the information in which a driven LED 40 or a driven PWM controller 54 is identified, and information of either turning-on designation or turning-off designation. In this case, the main controller 50 performs motion control of the corresponding PWM controller 54 in accordance with the turning-on designation or turning-off designation.

In the game system 1 of the present embodiment, the game device 10 determines if the controller 20 is located in the image capturing space of the image capturing device 2 based on the frame images continuously captured under the condition where the controller 20 turns on and off any one of the LEDs 40a to 40d. The game device 10 may estimate a position of the controller 20 in a space, as well as determines the existence of the controller 20. An estimated position may be used as an input for an application to be executed.

In addition, the game device 10 receives an input from the direction key 21 and the operation keys 26 or the like of the controller 20, as its basic function. Based on these input information, the game device 10 has a function to generate a game parameter of an application, to control the progress of a game, and to generate the AV data of a game image and a game sound. The AV data is output on the image display device 3 and the sound output device 4. A user plays a game by operating the controller 20 in the real space and further by operating the direction keys 21 and the operating buttons 26 for data input, while watching the game screen. A processing in the game device 10 will be described below.

Figure 7:
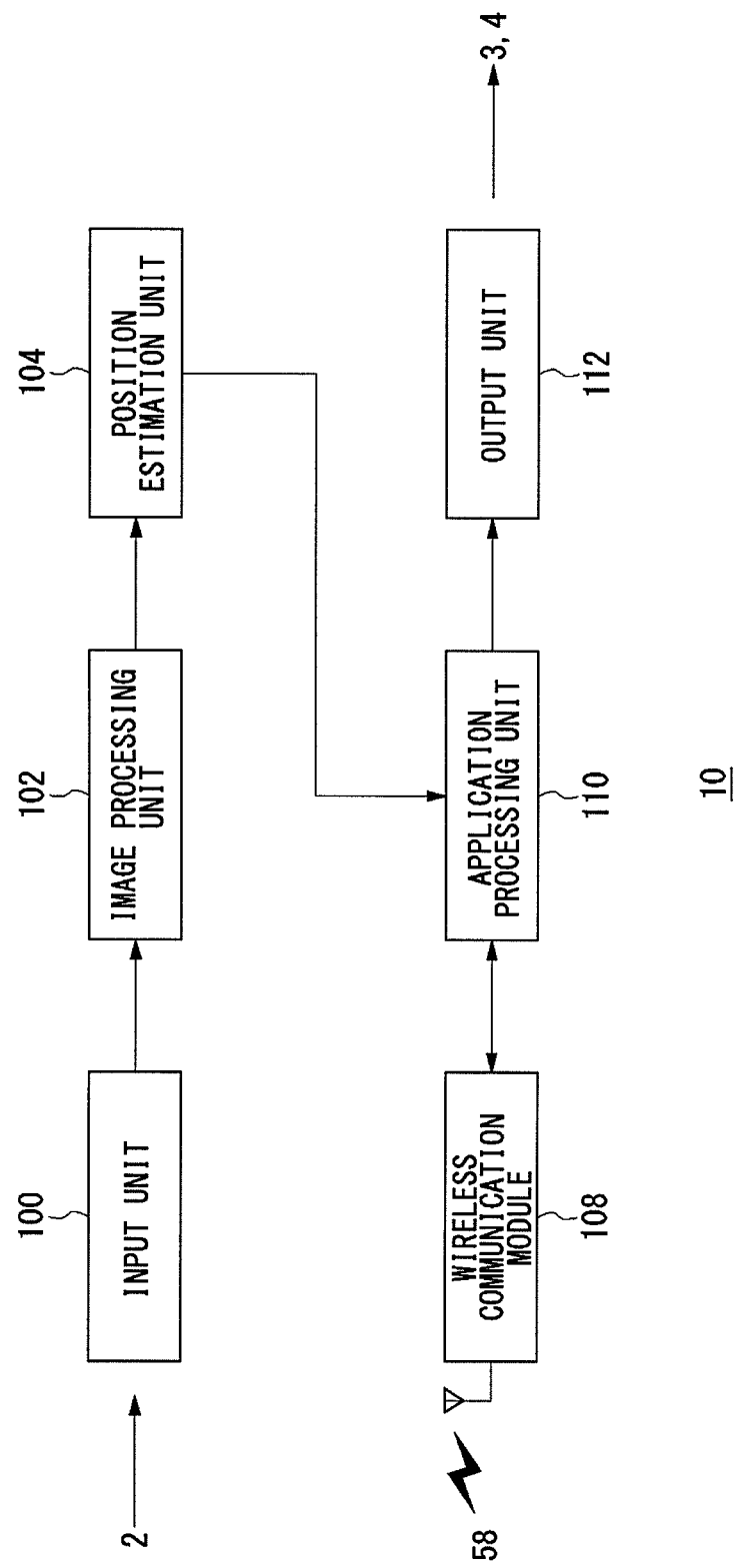
FIG. 7 is a diagram which shows a structure of a game device.

FIG. 7 shows a structure of a game device. The game device 10 includes an input unit 100, an image processing unit 102, a position estimation unit 104, a wireless communication module 108, an application processing unit 110, and an output unit 112. A processing function of the game device 10 of the present embodiment is achieved by a CPU, a memory, or a program loaded in a memory, or the like, and herein a structure achieved by a cooperation therewith is illustrated. A program may be built-in the game device 10, or be supplied from outside in the form of being stored in a recording medium. Therefore, it will be understood by a person skilled in the art that these function blocks can be realized in various forms by sole hardware, sole software, or a combination thereof. In the example shown in the Figure, a CPU of the game device 10 serves as an image processing unit 102, a position estimation unit 104, and an application processing unit 110. The game device 10 may be provided with a plurality of CPUs from an hardware structural point of view. In this case, a CPU may serve as an application processing unit 110 in which a game application is executed, and the other CPUs serve as an image processing unit 102 and a position estimation unit 104 in which an image captured by the image capturing device 2 is processed.

A wireless communication module 108 establishes a wireless communication with a wireless communication module 58 of the controller 20. In a phase for establishing the synchronization, the wireless communication module 108 makes inquiries to peripheral terminals including the controller 20, that is, the module performs an "inquiry" process. Specifically, the wireless communication module 108 broadcasts an IQ (inquiry) packet to nearby peripheral terminals. The wireless communication module 58 of the controller 20 which receives the IQ packet, returns an FHS (frequency Hop Synchronization) packet including the Bluetooth address and the Bluetooth clock information, to the game device 10. In transmitting and receiving the information at this moment, an agreement on the frequency hopping pattern is not established between the game device 120 and the controller 20, therefore a fixed hopping pattern defined only for IQ is used.

After receiving an FHS packet from the controller 20 and learning what types of controllers 20 exist, the wireless communication module 108 sends the ID packet to a particular controller 20. This is a "paging" process by the wireless communication module 108. Upon receiving a reply to the ID packet from the particular controller 20, the wireless communication module 108 transmits the FHS packet to the controller 20, informing the controller of its address and clock. Thus, the game device 10 and the controller 20 can share the same hopping pattern.

After "paging", the controller 20 and the game device 10 form a piconet therebetween to enter a "communication" state. A piconet means a network temporally formed between terminals when the Bluetooth terminals are located closely each other, and up to eight Bluetooth terminals can participate in a single piconet. The controller 20 connected thereto is assigned a slave identifier, that is, a three-bit address (1 to 7) which is assigned to the controller 20 connected, by the wireless communication module 108. The slave identifier is called as AM ADDR (Active Member Address). When being in a "connection" state, a control packet for setting a communication link is sent and received, thereby enabling "data transfer". In addition, the controller 20 may turn on and off an LED 40 in a manner that a user can confirm it visually, while setting an communication link therebetween, causing a user to recognize that a communication link is being set.

When the controller 20 participates in an application after the connection between the game device 10 and the controller 20 has been established, the application processing unit 110 assigns a controller number of the controller 20 and generates the information directing the number which directs the controller number. The wireless communication module 108 transmits the information directing the number to the controller 20. The controller 20, upon receiving the information directing the number, selects the LED 40 which corresponds to the information directing the number with reference to the corresponding table shown in FIG. 5, and controls the turning on and off of the LED 40 selected. Alternatively, the wireless communication module 108 may transmit the control information in which the LED 40 corresponding to the controller number is directed to be turned on, to the controller 20, instead of transmitting the information directing the number. In this case, the controller 20 controls the turning on and off of the corresponding LED 40 based on the control information.

The input unit 100 is structured as a USB interface and acquires frame images at a predetermined capturing speed (for example, 60 frames per second) from the image capturing device 2. The image processing unit 102 determines that the controller 20 is located in the capturing space of the image capturing device 2, based on the time-continuously captured frame images. Specifically, the image processing unit counts the number of frame images in which a turning-on LED 40 is continuously captured, and then determines the existence of the controller 20 based on the number counted.

The image processing unit 102, upon determining that the controller 20 is in the capturing space of the image capturing device 2, extracts an LED image from the frame images. The position estimation unit 104 acquires the position information of the LED images from the extracted LED image, and estimates the position of the controller 20.

In the game system 1 of the present embodiment, the position information of the controller 20, which is estimated from the position of the turning-on LED 40, may be used as an input for a game application. In this case, the position information of the controller 20 which is estimated by the position estimation unit 104, is transmitted to the application processing unit 110 one by one to be reflected on the application processing. The application processing unit 110 is also supplied with an input entered by a user using the direction key 21 or the like of the controller 20, via the wireless communication module 108. The application processing unit 110 advances a game based on the position information of the controller 20 and the input entered using the controller 20, and generates an image signal and a sound signal showing a result of the processing of a game. The image signal and the sound signal are transferred from the output unit 112 to the image display device 3 and the sound output device 4, respectively, before being output.

Figure 8:
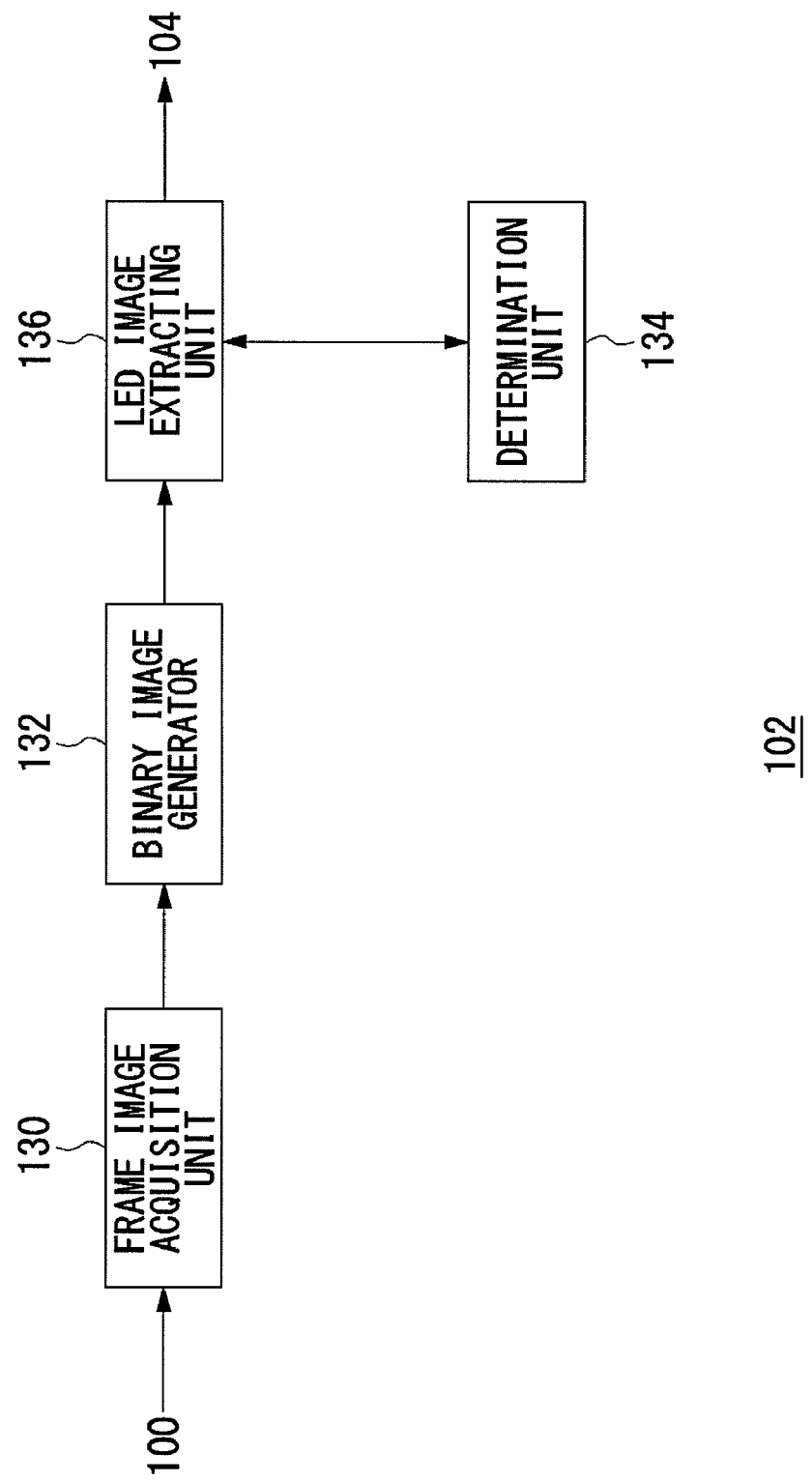
FIG. 8 is a diagram which shows a structure of an image processing unit.

FIG. 8 shows a structure of an image processing unit. The image processing unit 102 includes a frame image acquisition unit 130, a binary image generator 132, a determination unit 134, and an LED image extracting unit 136.

The frame image acquisition unit 130 acquires the data of a frame image from the input unit 100. The binary image generator 132 generates a binary image by performing binary processing on a frame image using a predetermined threshold value. A threshold value is set in accordance with the emission color of the LED 40. The binary image generator 132 sets the range of RGB pixel values for performing binary processing, to one in which only an image of the turning-on LED is extracted from the frame images, if possible. If the emission color of the LED 40 is red, the binary image generator 132 sets the pixel value range of red color (R) to 220-255, the range of green color (G) to 0-50, the range of blue color (B) to 0-50. The binary image generator 132 extracts RGB complex pixels falling within the above ranges, coding their pixel values as "1", and codes pixel values of RGB complex pixels not falling within the ranges as "0". For example, a pixel value of the complex pixel with R pixel value of 245, G of 30, and B of 20, is coded as "1", and a pixel value of the complex pixel with R pixel value of 100, G of 100, and B of 20, is coded as "0". By generating a binary image of a frame image, only objects with high R pixel values can be extracted in a frame image. In a binary image, a pixel with a pixel value of "1" is a white pixel, and a pixel with a pixel value of "2" is a black pixel.

Since the LED 40 is elongated rectangular shaped as shown in FIG. 3, an image of a turning-on LED 40 (hereinafter referred to as a "turning-on LED image") exists as a region in which white pixels are connected together in an elongated rectangular shape, in a binary image. The LED image extracting unit 136 extracts a turning-on LED image from a binary image.

Figure 9:
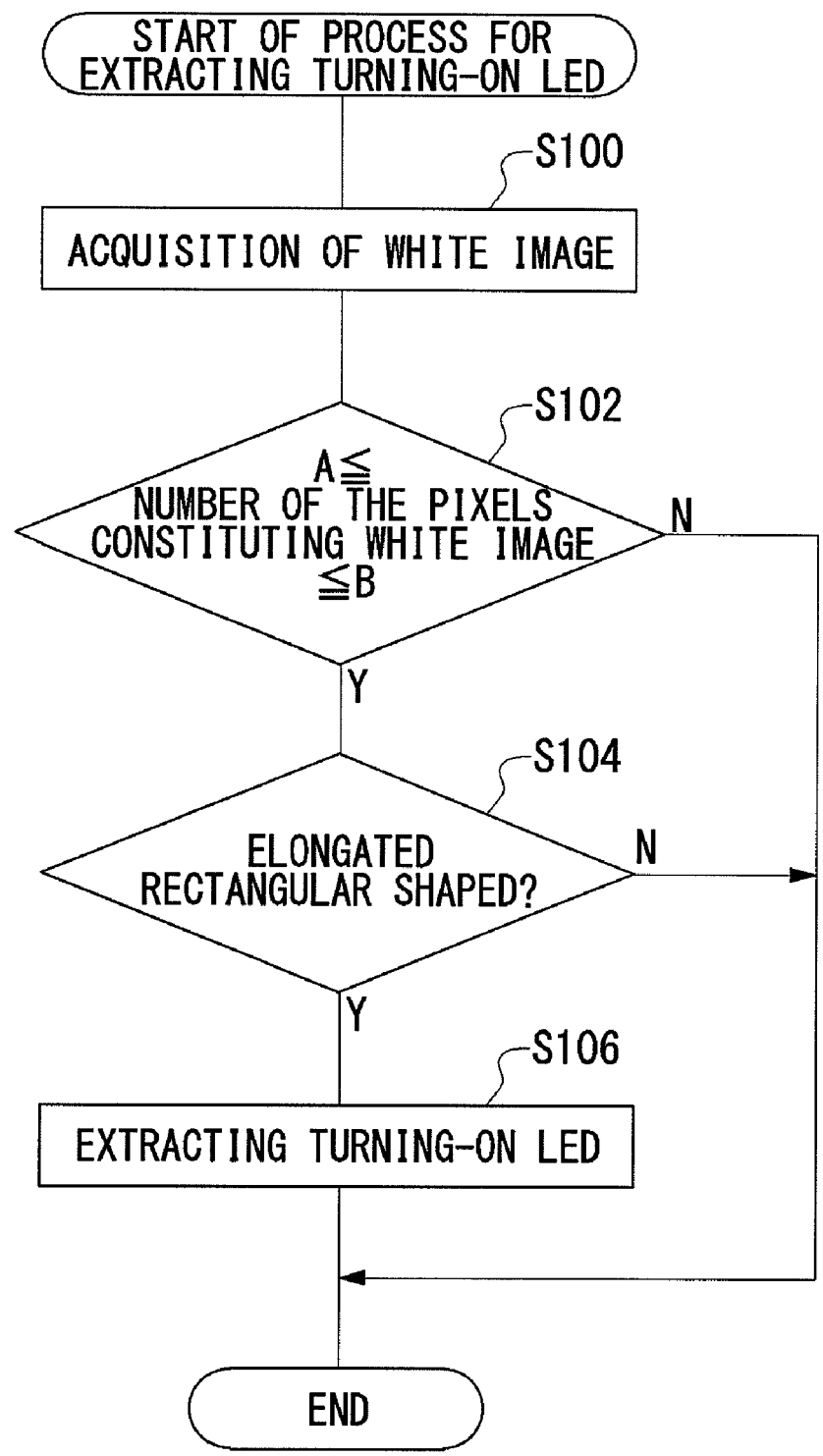
FIG. 9 is a flow chart which shows a procedure for extracting process of a turning-on LED image.

FIG. 9 is a flow chart showing a procedure for the process of extracting a turning-on LED image. The LED image extracting unit 136 acquires a region in which white pixels (a pixel with its pixel value of "1") are located continuously as a connecting region, in a binary image (S100). This connecting region is hereinafter referred to as a "white image". The LED image extracting unit 136 counts the number of the pixels constituting a white image (the number of the continuous pixels of a white image) and determines whether the number of the constituting pixels falls within the range ranging from a predetermined value A to a predetermined value B (both inclusive), or not (S102). If the number of the constituting pixels falls within the above range (S102/Y), the LED image extracting unit then determines whether the white image is elongated rectangular shaped, or not (S104). In S104, the LED image extracting unit 136 extracts the edge portions of the white image and determines the short sides and the long sides of the rectangle. If the length ratio of the short side and the long side is about a predetermined value, the LED image extracting unit determines that the white image is elongated rectangular shaped (S104/Y). Thereby, a white image processed is determined to be a turning-on LED image (S106), whereupon the processing of the white image is finished.

In S102, if the number of the constituting pixels is less than A (S102/N), the LED image extracting unit determines that the white image is not a turning-on LED image because the white image is too small, thus the processing of the white image being finished. Further, if the number is more than B (S102/N), the LED image extracting unit determines that the white image is not a turning-on LED image because the image is too large, thus the processing being finished. Still further, if the white image is not elongated rectangular shaped (S104/N) in S104, the processing of the white image is finished because the image is determined not to be a turning-on LED image. An extracting process shown in FIG. 9 is executed for all white images included in every binary image.

The determination unit 134, upon determining that a turning-on LED image is included in a binary image, determines that a controller 20 which turns on an LED 40 is located in the capturing space of the image capturing device 2. The determination unit 134 has the knowledge of controller numbers assigned to a plurality of controllers 20, and flashing patterns thereof, in order to perform the identification process for an controller 20. A controller number is informed by the application processing unit 110 prior to the extracting process of a turning-on LED image.

The game system 1 of the present embodiment utilizes four types of flashing patterns 1 to 4 shown in FIGS. 6(*a*) to 6(*d*), as a flashing pattern. As described before, the cycle (10T) of these flashing patterns is set in common, and each flashing pattern is formed by varying a duty ratio of turning on and off in a cycle. In the following description, the cycle 10T is assumed to be, for example, 0.5 seconds. Then, T is 1/20 seconds.

FIG. 10 shows a continuous turning-on period and a continuous turning-off period in each flashing pattern. For example, in the flashing pattern 1, the continuous turning-on period is 3/20 seconds (=0.15 seconds), which corresponds to a period during which nine frame images are captured. The continuous turning-off period is 7/20 seconds (0.35 seconds), which corresponds to a period during which 21 frame images are captured. Continuous turning-on periods and continuous turning-off periods in the flashing patterns 2 to 4 are as illustrated. The determination unit 134 holds a continuous turning-on period and a continuous turning-off period of each flashing pattern, in its memory (not shown) in advance. The determination unit, upon acquiring the number of the frame images in which a turning-on LED is continuously captured, identifies the controller 20 provided with the LED 40, based on a continuous turning-on period held in its memory.

The LED image extracting unit 136, upon extracting a turning-on LED image, transmits the information on the position of an extracted turning-on LED image in a frame image, to the determination unit 134. The information on the position may be, for example, the barycentric coordinates (X, Y) of a turning-on LED image. If a plurality of LED images are extracted in a binary image, each information on the position of each turning-on LED image is transmitted to the determination unit 134.

The determination unit 134, upon receiving the information on the position, recognizes that a turning-on LED is located in the image capturing space of the image capturing device 2. The information on the position is used for individual identification with the turning-on LED image extracted in the next frame image. In the present embodiment, the image capturing speed of the image capturing device 2, that is, the frame image generating speed is 1/60 seconds, causing a movable distance of the controller 20 during the period to be limited. Therefore, it is considered that when a turning-on LED 40 is detected in a frame image and the position coordinates at the time is (X1,Y1), an amount of change in positions of the turning-on LED in the next frame image is very small and therefore, the turning-on LED is located within a predetermined radius from the original position coordinates (X1,Y1). Therefore, the determination unit 134, upon receiving the position coordinates (X1,Y1) of a turning-on LED image in a frame image followed by the position coordinates (X2,Y2) of the same in the next frame image, determines whether the two position coordinates obtained in two continuous frame images, designate the turning-on positions of the same LED 40, or not, using the following equation.

[Equation 1]

$$F(X,Y) = \sqrt{(X2-X1)^2 + (Y2-Y1)^2} - D$$

D is set to a distance movable for 1/60 seconds in a frame image. A user generally plays a game at least one meter or so away from the image capturing device 2, while playing a game. The movable distance D in a frame image is preferably set in view of the distance from the image capturing device 2.

If F(X,Y) is more than 0, it is determined that in the turning-on LED images extracted in the two position coordinates (X1,Y1) and (X2,Y2), the turning-on states of different LEDs 40 are captured. On the other hand, if F(X,Y) is equal to or less than 0, it is determined that in the turning-on images extracted in the two positions coordinates (X1, Y1) and (X2, Y2), the turning-on states of the same LED 40 are captured. Further, the determination unit 134, upon receiving the position coordinates (X3, Y3) of a turning-on LED image in the next frame image, determines whether the two position coordinates (X2, Y2) and (X3, Y3) obtained in two continuous frame images, designate the turning-on positions of the same LED 40, or not, using the following equation.

[Equation 2]

$$F(X,Y) = \sqrt{(X3-X2)^2 + (Y3-Y2)^2} - D$$

In this way, it can be determined whether turning-on states of the same LED 40 are captured, or turning-on states of the different LEDs 40 are captured, by calculating whether the distance between the two position coordinates of the two turning-on LED images in the immediately preceding frame image and in the latest frame image, falls within a predetermined distance or not.

As described above, the determination unit 134, upon determining that in the turning-on LED images in the two continuous frame images the same LED 40 is captured, counts the number of frame images in which the LED 40 is captured in its turning-on-states. That is, the determination unit 134 continues to count the number of the frame images during the period from the first confirmation of the turning-on of the LED 40 to the last confirmation of the same.

The determination unit 134, for example, upon confirming that the same LED 40 is captured in its turning-on states in nine continuous frame images, determines that the LED 40 turns on and off in the flashing pattern 1, based on a continuous turning-on period of each flashing pattern shown in FIG. 10. Similarly, the determination unit 134, upon confirming that the same LED 40 is captured in its turning-on states in 15 continuous frame images, confirms that the LED 40 turns on and off in the flashing pattern 2. Since the determination unit 134 grasps the flashing patterns assigned to each controller 20, the determination unit can identify the controller 20 which holds the LED 40.

FIG. 11 is an illustrative diagram to explain a turning-on LED image which is captured in continuous frame images by the LED image extracting unit 136. FIG. 11(a) shows a flashing state of the LED 40 which turns on and off in the flashing pattern 1. The LED 40 continuously turns on for 0.15 seconds, and continuously turns off for 0.35 seconds, in a cycle of 0.5 seconds. The turning on and off processing of the LED 40 and the capturing processing by the image capturing device 2, are executed asynchronously. A continuous turning-on period of 0.15 seconds corresponds to a period during which nine frame images are captured by the image capturing device 2.

FIGS. 11(b) to 11(f) show capturing states by the image capturing device 2, wherein "1" means that the LED 40 is captured, and "0" means that the LED 40 is not captured.

In a capturing state shown in FIG. 11(b), a turning-on LED 40 is captured in over nine continuous frame images. In the capturing state, the turning on and off processing of the LED 40 and the capturing processing of the image capturing device 2 accidentally synchronize, causing turning-on LED images to be included in the nine continuous frame images.

In a capturing state shown in FIG. 11(c), a turning-on LED 40 is captured in over ten continuous frame images. The turning on and off processing of the LED 40 and the capturing processing of the image capturing device 2 are asynchronous. In the capturing state, turning-on LED images are included in the ten continuous frame images.

In a capturing state shown in FIG. 11(d), a turning-on LED 40 is captured in over eight continuous frame images. In the capturing state, the turning on and off processing of the LED 40 and the capturing processing of the image capturing device 2 are asynchronous. The time difference of the processing is the same as that shown in FIG. 11(c); however, being different from the capturing state shown in FIG. 11(c), it shows the case where the turning-on images at the start of turning-on and at the end of turning-on, have not been acquired. In this case, turning-on LED images are included in the eight continuous frame images.

In a capturing state shown in FIG. 11(e), a turning-on LED 40 is captured in over nine continuous frame images. The turning on and off processing of the LED 40 and the capturing processing of the image capturing device 2 are asynchronous. In the capturing state, turning-on LED images are included in the nine continuous frame images.

In a capturing state shown in FIG. 11(f), a turning-on LED 40 is captured in over nine continuous frame images. The turning on and off processing of the LED 40 and the capturing processing of the image capturing device 2 are asynchronous. In the capturing state, turning-on LED images are included in the nine continuous frame images.

As described above, since the turning on and off processing of the LED 40 and the capturing processing of the image capturing device 2 are asynchronous, the number of the turning-on LED images which can be acquired, is any one of (N−1), N, or (N+1), even if a continuous turning-on period of the LED 40 corresponds to a capturing period during which N pieces of frame images are captured. Accordingly, when M pieces of frame images in which turning-on LED images of the same LED 40 are extracted, are counted, the determination unit 134 can identify a controller provided with the LED 40, by identifying the flashing patterns in which a continuous turning-on period falls within the range ranging from a period during which (M−1) frame images are captured, to a period during which (M+1) frame images are captured.

In addition, even if a continuous turning-on period corresponds to a period during which N pieces of frame images are captured, the number of the frame images captured by the image captured device 2 is any one of (N−1), N, or (N+1). For the reason, if a continuous turning-on period corresponds to a period during which a single frame image is captured, there occurs a case where a turning-on LED image cannot be acquired. Therefore, the controller 20 preferably turns on and off the LED 40 in a flashing pattern by which a continuous turning-on period of the LED 40 is equal to or longer than a period during which two continuous frame images are captured.

Further, in order to recognize flashing patterns distinguishably, a continuous turning-on period and a continuous turning-off period of each flashing pattern are preferable different from each other by a period equal to or longer than a period during which two frame images are captured.

In the above embodiments, a method for identifying an LED in view only of a continuous turning-on period, has been explained. Considering a continuous turning-off period in addition to that may improve the accuracy of the identification of an LED 40. In this case, a continuous turning-off period of an LED 40 is considered to be a period from the time when a turning-on LED is last extracted to the time when a turning-on LED 40 is next extracted in and around the position, thereafter being compared with the continuous turning-off period in each flashing pattern. This way is the same as what is explained about a continuous turning-on period. Therefore, it is preferable that a continuous turning-off period is also equal to or longer than a period during which two continuous frame images are captured, in the same way as that of a continuous turning-on period. In identifying an LED 40 using the number of frame images, the number of frame images from the frame in which a turning-on LED cannot be captured first, to the frame in which a turning-on LED can be captured next in and around the position, is considered to be the number of the frames during a period when an LED 40 continuously turns off. Thereby, the number of frame images may be compared with the numbers of frame images corresponding to a continuous turning-off period in each flashing pattern.

Since the determination unit 134 identifies a controller 20 based on the position information as described above, the determination unit 134 can identify a controller 20 individually if a plurality of controllers 20 are provided in the game system 1. Each controller 20 executes the turning on and off of an LED 40 which is assigned to the controller number set to each controller, according to a flashing pattern defined in accordance with the controller number. Since the determination unit 134 grasps the controller numbers and the flashing patterns which are assigned to each controller 20 provided in the game system 1, the determination unit can identify each controller 20 based on the position information of the turning-on LED images which are sent by the LED image extracting unit 136.

The determination unit 134, upon identifying a controller number, sends the information back to the LED image extracting unit 136. The LED image extracting unit 136 associates the position information of a turning-on LED 40 with the controller number of the controller 20 holding the LED 40, thereafter sends the associated information to the position estimation unit 104.

The position estimation unit 104 acquires the position information of the LED 40. The position estimation unit 104 may estimate a distance from the controller 20, based on the intensity of a received radio wave sent by the controller 20. Thus, the position estimation unit 104 can estimates the position coordinates (X, Y, Z) of the controller 20 in a space. The position estimation unit 104 sends the estimated position information of the controller 20 to the application processing unit 110. If a game application needs only the position information of the LED 40 in a frame image, the position estimation unit 104 associates the controller number with the position information thereof without estimating a distance, and sends the information to the application processing unit 110.

The application processing unit 110 reflects the estimated position of the controller 20 on the processing of a game application as a game input. Although various ways in which the estimated position is reflected can be made, in the most intuitive way, a virtual object is made to follow the position in a game image corresponding to the estimated position of the controller 20 and is displayed. A user can move an virtual object in a game image following the movement of the controller 20, by moving the controller 20 relative to the image capturing device 2.

The present invention has been described above in conjunction with the embodiments thereof. The embodiment has been given solely by way of illustration, and it will be understood by a person skilled in the art that various modifications may be made to combinations of the foregoing components and processes, and all such modifications are also intended to fall within the scope of the present invention.

Although the flashing pattern of an LED 40 is identified based on its continuous turning-on period and its continuous turning-off period in the present embodiments, an LED 40 may be turned on and off at a high frequency by being subject to the PWM control during a continuous turning-on period. A flashing frequency is set so that a user does not recognize an LED turns on and off, on the other hand, the image capturing device 2 can capture that the LED turns on. Therefore, a flashing frequency is determined in view of a shutter speed of the image capturing device 2. That is, a flashing frequency has to be determined so that the flash of an LED 40 during a continuous turning-on period is recognized as the turning on during the exposure time of the image capturing device 2. The emission brightness of each LED 40 can be the same by a way in which each controller 20 performs PWM control on each LED 40 during each turning-on period. For example, the emission brightness during the continuous turning-on period 3T in the flashing pattern shown in FIG. 6(*a*), can be equal to that during the continuous turning-on period 5T in the flashing pattern shown in FIG. 6(*b*), by setting the duty ratio during the 5T of FIG. 6(*b*) to the ratio obtained by multiplying the duty ratio during the 3T of FIG. 6(*a*) by ⅗. Each emission brightness of each LED 40 can be the same by setting each duty ratio during each continuous turning-on period, so that each duty ratio of each LED 40 be the same in a common cycle.

In the present embodiments, an LED 40 is shown as a light emission element provided in the controller 20. Alternatively, a controller 20 may be provided with an infrared-ray emission element. In the above embodiments, the cycle of each flashing pattern is the same, however, the cycles may be different. Even if the cycles are different, the emission brightness of each LED 40 can be the same by setting the duty ratios in each frequency to the same.

INDUSTRIAL APPLICABILITY

The present invention can be employed in an entertainment system in which a camera is used.

The invention claimed is:

1. An entertainment system comprising:
   a plurality of input devices through which a user performs an input operation;
   a processing device which processes an application based on the input entered into the plurality of input device and generates an image signal showing a processing result of the application;
   an image capturing device which captures images of a space;
   an image display device which outputs the image signal generated by the processing device,
   wherein each of the plurality of input devices has
      a plurality of input units through which a user performs the input operation to make the application proceed,
      a light emitting element for expressing a number assigned to each of the plurality of input devices in the application to be executed, and
      the plurality of input devices periodically repeat turning on and off of the light emitting element in respective flashing patterns having different duty ratios each determined in accordance with the number assigned to each of the plurality of input devices,
   wherein the processing device comprises:
   an extracting unit configured to extract an image of a turned-on light emitting element from captured images that have been successively captured at a predetermined capturing speed by the image capturing device and to generate positional information indicating a position of the extracted image of the light-emitting element in the captured images; and
   a determination unit configured to determine, when it is determined that two images of light-emitting element are at a predetermined distance or less from each other in the captured images by referring to two items of positional information in two successively captured images generated by the extracting unit, that said images of light-emitting element in the two successively captured images are those of the same light-emitting element, and to count the number of captured images in which the turned-on state of the light-emitting element is successively captured;
   wherein the determination unit has a database of the flashing pattern of each of the input devices and refers to the number of captured images in which the turned-on state of the same light-emitting element is successively captured using the database so as to identify an input device having said light emitting element, and
   wherein the positional information of the image of the light-emitting element held by the identified input device is reflected in application processing.

2. The entertainment system according to claim 1, wherein each of the flashing patterns having different duty ratios is set so that a continuous turned-on period of the light-emitting element is equal to or longer than a period during which two continuous images are captured, and
   a continuous turned-off period of the light-emitting element is equal to or longer than a period during which two continuous images are captured.

3. The entertainment system according to claim 1, wherein the processing device assigns flashing patterns to the plurality of input devices in the order of establishment of connection of the input units to the processing device, the flashing patterns being assigned in an ascending order of duty ratios.

4. The entertainment system according to claim 3, wherein the flashing patterns assigned to the input devices have the same duty cycle.

5. The entertainment system claim 1, wherein, given that the number of captured images in which the turned-on state of the same light-emitting element is successively captured is N, the determination unit identifies the input device having said light-emitting element by identifying a flashing pattern in which the continuous turned-on period of the light-emitting element is in a range between a period of time of (N−1) captured images and a period of time of (N+1) captured images.

6. The entertainment system according to claim 5, wherein the turning on and off processing of the light-emitting element and the capturing processing by the image capturing device are executed asynchronously.

7. The entertainment system according to claim 1, wherein the input device turns on only one light emitting element, which is assigned to the number set in the input device, and makes it serve as an indicator expressing the number.

8. The entertainment system according to claim 1, wherein the processing device transmits to the input device information to control the turning on of the light emitting element, and
   the input device turns on the light emitting element in accordance with the information.

9. The entertainment system according to claim 1, wherein the input device comprises a plurality of pulse width modulation controllers, each of which controls the turning on of each of the light emitting elements.

10. A processing device comprising:
    an application processing unit which processes an application based on an input entered into a plurality of input devices;
    an acquisition unit which acquires data for a frame image in which a space, in which light emitting elements of the plurality of input devices are located, is captured, the light emitting elements periodically flashing in flashing patterns having different duty ratios each determined by a number assigned in the application; and
    an extracting unit configured to extract an image of a turned-on light-emitting element from data for successively captured frame images and to generate positional information indicating a position of the extracted image of the light-emitting element in the frame images; and
    a determination unit configured to determine, when it is determined that two images of a light-emitting element are at a predetermined distance or less from each other in the frame images by referring to two items of positional information in two successive frame images generated by the extracting unit, that said images of the light-emitting elements in the two successive frame images are those of the same light-emitting element, and to count the number of frame images in which the turned-on state of the light-emitting element is successively captured, wherein the determination unit has the knowledge of the flashing pattern of each of the input devices and refers to the number of frame images in which the turned-on state of the same light-emitting element is successively captured so as to identify an input device having said light emitting element, and wherein the application processing unit reflects the positional information of the image of the light-emitting element of the identified input device in application processing.

11. A non-transitory computer-readable medium embodying a computer program product, comprising:

a module which sets a number for a plurality of input devices in an application to be executed;

a module which processes the application based on an input entered into the plurality of input devices;

a module which acquires data for a frame image in which a space, in which light emitting elements of the plurality of input devices are located, is captured, the light emitting elements periodically flashing in flashing patterns having different duty ratios each determined by the set number;

a module which extracts an image of a turned-on light-emitting element from data for successively captured frame images, and generates positional information indicating a position of the extracted image of the light-emitting element in the frame images;

a module which determines whether two images of light-emitting elements are at a predetermined distance or less from each other in the frame images by referring to two items of generated positional information in two successive frame images;

a module which determines, when the two images of the light-emitting elements are at a predetermined distance or less from each other in the frame images, that said images of light-emitting elements in the two successive frame images are those of the same light-emitting element, and which counts the number of frame images in which the turned-on state of the light-emitting element is successively captured; and a module which refers to the number of frame images in which the turned-on state of the same light-emitting element is successively captured so as to identify an input device having said light emitting element.

* * * * *